UNITED STATES PATENT OFFICE.

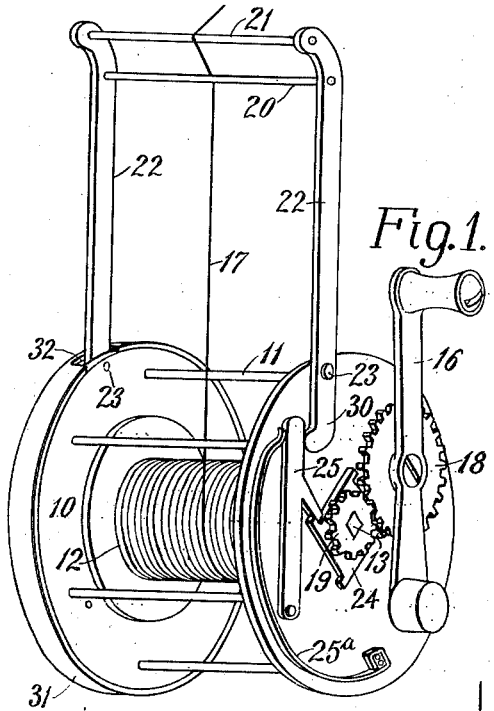
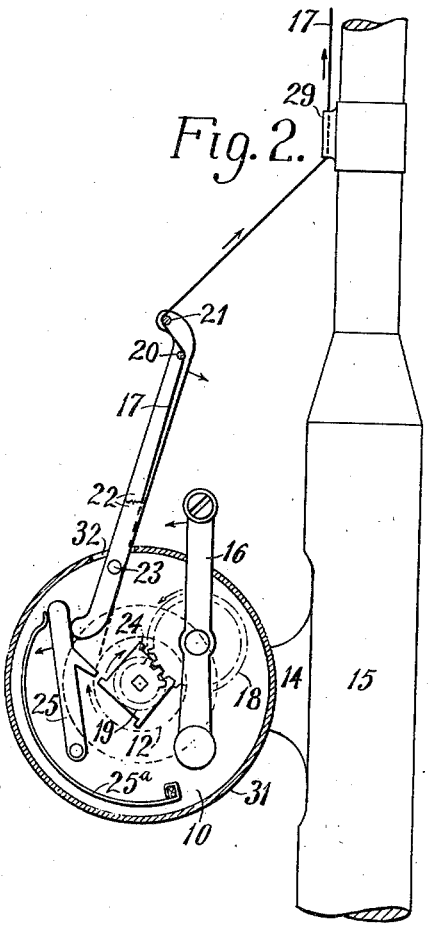
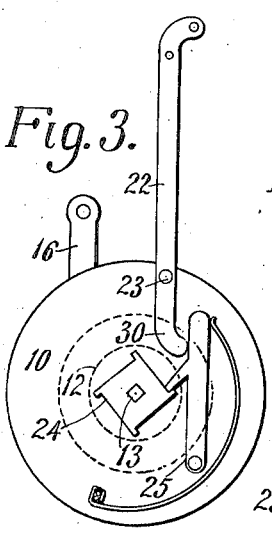
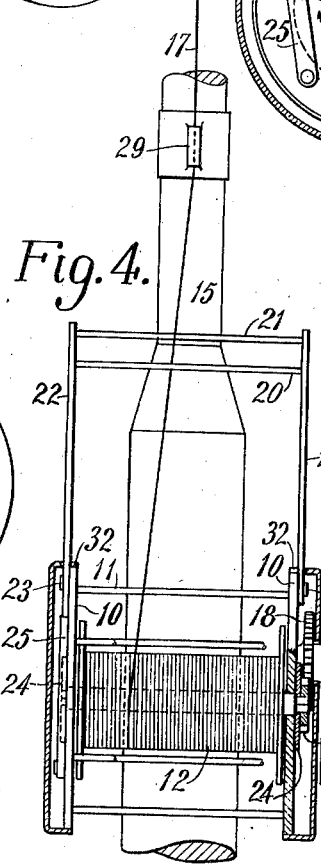
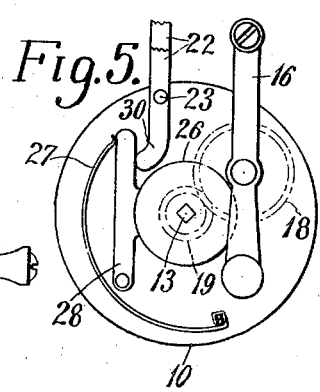

JOHN A. WHERRY, OF NEW ORLEANS, LOUISIANA.

FISHING-REEL.

1,303,525.　　　　　Specification of Letters Patent.　　Patented May 13, 1919.

Application filed December 21, 1917. Serial No. 208,231.

*To all whom it may concern:*

Be it known that I, JOHN A. WHERRY, a citizen of the United States, residing in New Orleans, in the parish of Orleans and State of Louisiana, have invented certain new and useful Improvements in Fishing-Reels, of which the following is a specification.

This invention relates to reels which are usually used upon fishing poles, and its object is to improve the control over the fishing line.

It has been proposed to employ a brake upon the reel, so as to prevent the same from overthrowing because of the momentum acquired during rapid paying out of the line, as when casting the line, or when a fish darts away with the hook on the end of the line and then suddenly stops or returns. But it is found that such brake interferes with the free unwinding of the reel, and, hence, that the fish is apt to become detached from the hook, and other objections arise. For this reason, it has been the custom in many cases to omit the brake and to let the line run loosely, but this also is found objectionable, because, owing to the looseness of the line, the angler cannot definitely feel the initial pull of the fish upon the hook, and is left in doubt as to whether a fish has been caught.

The object of my invention is to avoid the difficulty due to the use of a brake or other check, and hence secure the advantage of having the line pay out freely, and at the same time to retain sufficient control of the line, so as to enable the operator readily to feel the initial tug of the fish. To this end, I arrange for the line to be under the control of a check, which may be in the form of a brake, although in some cases it may be in the form of a pawl and ratchet. The angler, because of the use of the check, can readily feel the initial pull of the fish upon the hook. However, I have further arranged that the tautness of the line shall instantly release the reel from the control of the brake, pawl, or other check, so that the line can pay off freely so long as the tension thereon is maintained. But as soon as the tension is released, by the stopping or turning of the fish, or for other reasons, the check is restored to effective condition, thus preventing overthrow of the reel and consequent tangling of the line.

Other features and advantages will hereinafter appear.

In the accompanying drawings,

Figure 1 is a perspective view of a reel mechanism illustrating my improvements in one form. The check is shown in normal effective condition.

Fig. 2 is a sectional side elevation of the same, mounted upon a section of fishing pole, and illustrating the line as paying off rapidly from the released reel.

Fig. 3 is a diagrammatic elevation to show the relative normal positions of the parts, where the check is in the form of a pawl and ratchet.

Fig. 4 is a part-sectional front elevation of parts seen at Fig. 2.

Fig. 5 shows the check in the form of a brake.

The reel frame may comprise end disks, cups or shells 10, connected by struts or tie-rods 11 and carrying a spool 12, rotating upon a spindle 13. The frame may be supported by a mount 14 upon the fishing pole 15; and a handle 16 may be used to wind the line 17 upon the heel 12, said handle connected by a gear 18 and pinion 19 to the reel shaft 13 for rotating the same rapidly. The line running from the spool is led under one cross-bar 20 and over another 21, for the purpose of enabling the occasional tension on the line to perform certain functions; said cross-bars or line-binding guides being in proximity to each other, and mounted upon a pair of arms 22, which extend from the flanges 10, the latter being fixed upon the pole. These arms 22 and cross-bars 20, 21, may be firmly fastened together to form a bail or frame, which is pivoted at 23 to the opposite flanges 10, so as to be capable of yielding.

The reel spindle or shaft 13 may be provided with a ratchet wheel 24 with which may coöperate a pawl or click 25 pivoted upon one flange 10 and pressed by a spring 25ª into engagement with the ratchet wheel, to prevent the reel from unwinding. In another form of the invention, Fig. 5, a friction disk 26 may be fixed to the shaft or spindle 13 of the reel, and a spring 27 may press a brake-arm 28 against said friction disk 26, to prevent the reel from unwinding freely.

The fishing line is led from the reel to the under bar or guide 20, and passes under the same and then up and over the upper bar or guide 21, and then down to an eye or guide 29 which is mounted upon the fishing pole 15 in advance of the reel. The tension upon the line produced by the movement of a fish, or by a cast of the line, or otherwise, pulls down the upper bar 21 and hence the entire frame 20, 21, 22, upon its pivot or hinge 23, whereby an arm 30 extending from the rear or lower end thereof will lift up the pawl 25 against the tension of spring 25$^a$ and release the ratchet wheel, so that the reel is permitted to unwind freely. The frame 20, 21, 22 and arm 30, therefore, constitute a line-controlled disabling means for the check or brake mechanism.

It will be understood that even though the reel may freely unwind, still there is enough residual tension upon the line to hold down the guide-bar frame 20, 21, 22, that is, to prevent it from rising again and permitting the pawl to be restored to engagement with the ratchet wheel. This residual tension may be due partly to the friction of the reel in its bearings, and partly to the friction of the line as it winds over first one guide-bar and then the other, or in case of a temporary overthrow of the reel to the last element only; and to augment said residual tension, these guide-bars 20, 21 may be placed closely together. Said residual tension may be made of any required efficiency, by placing the bars 20, 21 so that the line will have to turn to a greater or less extent around each bar; the greater such extent, the greater the friction and consequent tension, and vice versa.

Thus it will be seen that upon casting the line, the tension thereon may pull down the release bar frame 20, 21, 22, and release the ratchet wheel 24 or friction disk 26, as the case may be, and thus permit the reel to unwind freely. When the hook and sinker reach the water and the line consequently stops paying off, the pawl 25 or brake 28 reengages the ratchet wheel 24 or friction disk 26, and prevents overthrow of the reel and tangling of the line. The ratchet or brake then remains in effective condition, so that if a fish should tug at the hook, the angler would instantly be made fully aware of the fact, as there cannot be sufficient tension placed upon the line to effect the release of the ratchet or brake, without the tug being felt by the angler. Since this tautening of the line releases the ratchet or brake, the fish may swim away with the line paying out freely; but when the fish turns its course or stops, the check immediately becomes effective again, and overthrow of the reel is avoided.

The frame 20, 21, 22 may be used as a handle or finger-piece, to be operated by the angler at any time to release the reel, as when winding up the line thereon, or for other purposes.

Preferably, each disk 10 is provided with a cover having a flange 31 to fit over the disk, said cover with its flange and with the disk 10 forming the shell which contains the gears, ratchet wheel and pawl (or disk 26 and brake 28). Each cover flange 31 may be recessed or cut away at 32 to clear the projecting arm 22.

Variations may be resorted to within the scope of the invention, and portions of the improvements may be used without others.

Having thus described my invention, I claim:

1. The combination, with a fishing pole having a reel mounted thereon, of a check or brake mechanism, normally effective to oppose a rotation of said reel in its unwinding sense, said brake mechanism including disabling means for rendering and maintaining the same ineffective during the paying out of a line, said disabling means comprising a movable line-controlled member and a tension device to control the movement of said member, said device being so located as to have engaging relation with said line at a point separated from its point of departure from said reel, the tension exerted by said device being such as to cause said line-controlled member to be moved and maintained in such position as to render said disabling means continuously effective during the paying out of said line irrespective of the variation in its tension between said tension device and said reel.

2. The combination, with a fishing pole having a reel mounted thereon, of a check or brake mechanism, normally effective to oppose a rotation of said reel in its unwinding sense, said brake mechanism including disabling means for rendering and maintaining the same ineffective during the paying out of a line, said disabling means comprising a movable line-controlled member and a tension device to control the movement of said member, said device being so located as to have engaging relation with said line at a point separated from its point of departure from said reel, the tension exerted by said device being such as to cause said line-controlled member to be moved and maintained in such position as to render said disabling means continuously effective during the paying out of said line irrespective of the variation in its tension between said tension device and said reel, and means normally tending to return said disabling means to its ineffective position, and to maintain it so, when said line is relieved of tension in the portion beyond said tension device.

3. The combination, with a fishing pole having a reel mounted thereon, of a check or brake mechanism, normally effective to oppose a rotation of said reel in its unwinding sense, said mechanism including disabling means for rendering and maintaining the same ineffective during the paying out of a line, said disabling means comprising a movable line-controlled member and a tension device to control the movement of said member, and through which said line may pass as it is unwound from said reel, the tension exerted by said device being such as to cause said line-controlled member to be moved and maintained in such position as to render said disabling means continuously effective during the paying out of said line irrespective of the variation in its tension between said tension device and said reel, and means normally tending to return said disabling means to its ineffective position, and to maintain it so, when said line is relieved of tension in the portion beyond said tension device.

4. The combination, with a fishing pole having a reel mounted thereon, of a check or brake mechanism, normally effective to oppose a rotation of said reel in its unwinding sense, said mechanism including disabling means for rendering and maintaining the same ineffective during the paying out of a line, said disabling means comprising a movable line-controlled member and a tension device to control the movement of said member, said device comprising a plurality of parallel guide-bars about which said line may be passed in alternation after being unwound from said reel, so as to produce sufficient frictional engagement therewith to cause said line-controlled member to be moved and maintained in such position as to render said disabling means continuously effective during the paying out of said line irrespective of the variation in its tension between said tension device and said reel, and means normally tending to return said disabling means to its ineffective position, and to maintain it so, when said line is relieved of tension in the portion beyond said tension device.

5. The combination, with a fishing pole, and a reel and line-guide mounted in spaced relation thereon, of a check or brake mechanism, normally effective to oppose a rotation of said reel in its unwinding sense, said mechanism including disabling means for rendering and maintaining said mechanism ineffective during the paying out of a line, said disabling means comprising a movable controller-arm having a tension device mounted thereon in such position as to have engaging relation with said line at a point lying between but out of the direct line from its point of departure from said reel to said line-guide, and so as to be moved and maintained in such position as to render said disabling means continuously effective during the paying out of said line irrespective of the variation in its tension between said tension device and said reel.

6. The combination, with a fishing pole, and a reel and line-guide mounted in spaced relation thereon, of a check or brake mechanism, normally effective to oppose a rotation of said reel in its unwinding sense, said mechanism including disabling means for rendering and maintaining said mechanism ineffective during the paying out of a line, said disabling means comprising a movable controller-arm having a tension device mounted thereon in such position as to have engaging relation with said line at a point lying between but out of the direct line from its point of departure from said reel to said line-guide, and so as to be moved and maintained in such position as to render said disabling means continuously effective during the paying out of said line irrespective of the variation in its tension between said tension device and said reel, and means constantly tending to return said controller-arm to its normal position, and to maintain it so, when said line is relieved of tension in the portion beyond said tension device.

7. The combination, with a fishing pole, and a reel and line-guide mounted in spaced relation thereon, of a check or brake mechanism, normally effective to oppose a rotation of said reel in its unwinding sense, said mechanism including disabling means for rendering and maintaining said mechanism ineffective during the paying out of a line, and disabling means comprising a movable controller-arm having a tension device mounted thereon, said tension device comprising a plurality of parallel guide-bars about which said line may be passed in successive frictional contact in a tortuous course on its way from its point of departure from said reel to said line-guide, said bars being so located as to cause said controller-arm to be moved and maintained in such position as to render said disabling means continuously effective during the paying out of said line irrespective of the variation in its tension between said tension device and said reel, and means constantly tending to return said controller-arm to its normal position, and to maintain it so, when said line is relieved of tension in the portion beyond said tension device.

JOHN A. WHERRY.

Witnesses:
 HOWELL CARTER, Jr.,
 STAFFORD M. SMITH.